(12) United States Patent
Morris et al.

(10) Patent No.: US 11,581,970 B2
(45) Date of Patent: Feb. 14, 2023

(54) SYSTEM FOR DELIVERABLES VERSIONING IN AUDIO MASTERING

(71) Applicant: Lucasfilm Entertainment Company Ltd. LLC, San Francisco, CA (US)

(72) Inventors: Stephen Morris, San Francisco, CA (US); Scott Levine, San Anselmo, CA (US); Nicolas Tsingos, San Francisco, CA (US)

(73) Assignee: Lucasfilm Entertainment Company Ltd. LLC, San Francisco, CA (US)

( * ) Notice: Subject to any disclaimer, the term of this patent is extended or adjusted under 35 U.S.C. 154(b) by 56 days.

(21) Appl. No.: 17/236,817

(22) Filed: Apr. 21, 2021

(65) Prior Publication Data
US 2022/0345234 A1 Oct. 27, 2022

(51) Int. Cl.
| H04H 60/04 | (2008.01) |
| G10L 25/57 | (2013.01) |
| G06F 3/16 | (2006.01) |
| G06V 20/40 | (2022.01) |

(52) U.S. Cl.
CPC ............. *H04H 60/04* (2013.01); *G06F 3/165* (2013.01); *G06V 20/46* (2022.01); *G10L 25/57* (2013.01)

(58) Field of Classification Search
CPC ..................................................... H04H 60/04
See application file for complete search history.

(56) References Cited

U.S. PATENT DOCUMENTS 10,445,056 B1 * 10/2019 Morris ................... G10L 25/57
2020/0394999 A1 * 12/2020 Levine ................ G11B 27/031

* cited by examiner

*Primary Examiner* — Olisa Anwah

(57) ABSTRACT

Some implementations of the disclosure relate to using a model trained on mixing console data of sound mixes to automate the process of sound mix creation. In one implementation, a non-transitory computer-readable medium has executable instructions stored thereon that, when executed by a processor, causes the processor to perform operations comprising: obtaining a first version of a sound mix; extracting first audio features from the first version of the sound mix obtaining mixing metadata; automatically calculating with a trained model, using at least the mixing metadata and the first audio features, mixing console features; and deriving a second version of the sound mix using at least the mixing console features calculated by the trained model.

19 Claims, 12 Drawing Sheets

SYSTEM FOR DELIVERABLES VERSIONING IN AUDIO MASTERING

BRIEF SUMMARY OF THE DISCLOSURE

Implementations of the disclosure describe systems and methods that leverage machine learning to automate the process of creating various versions of sound mixes.

In one embodiment, a non-transitory computer-readable medium has executable instructions stored thereon that, when executed by a processor, causes the processor to perform operations comprising: obtaining a first version of a sound mix; extracting first audio features from the first version of the sound mix obtaining mixing metadata; automatically calculating with a trained model, using at least the mixing metadata and the first audio features, mixing console features; and deriving a second version of the sound mix using at least the mixing console features calculated by the trained model.

In some implementations, deriving the second version of the sound mix, comprises: inputting the mixing console features derived by the trained model into a mixing console for playback; and recording an output of the playback.

In some implementations, deriving the second version of the sound mix, comprises: displaying to a user, in a human readable format, one or more of the mixing console features derived by the trained model. In some implementations, deriving the second version of the sound mix, further comprises: receiving data corresponding to one or more modifications input by the user modifying one or more of the displayed mixing console features derived by the trained model; and updating the mixing console features based on the one or more modifications.

In some implementations, the operations further comprise: extracting video features from video corresponding to the first version of the sound mix; and automatically calculating the mixing console features, comprises: automatically calculating with the trained model, using at least the mixing metadata, the first audio features, and the video features, the mixing console features. In some implementations, the operations further comprise: automatically calculating with the trained model, using at least the mixing metadata, the first audio features, and the video features, second audio features for deriving the second version of the sound mix.

In some implementations, the mixing metadata comprises a type of mixer or an identifier of a mixer; and obtaining the mixing metadata, comprises: receiving data corresponding to input by a user selecting the type of mixer or the identifier of the mixer to be input into the trained model. In some implementations, receiving the data corresponding to the input by the user selecting the type of mixer or the identifier of the mixer to be input into the trained model, comprises: receiving a selection of a first mixer that is different from a second mixer corresponding to the first version of the sound mix.

In some implementations, the mixing metadata comprises a type of mixer or an identifier of a mixer; and obtaining the mixing metadata, comprises: extracting, from mixing console data corresponding to the first version of the sound mix, the type of mixer or the identifier of the mixer; and In some implementations, the operations further comprise: automatically calculating with the trained model, using at least the mixing metadata and the first audio features, second audio features for deriving the second version of the sound mix. In some implementations, the operations further comprise: displaying to a user a first option to derive the second version of the sound mix using the mixing console features, and a second option to derive the second version of the sound mix using the second audio features; and receiving input from the user selecting the first option.

In some implementations, the mixing console features comprise console automation data, the console automation data including time-domain control values for one or more audio processing components for an audio channel.

In one embodiment, a non-transitory computer-readable medium has executable instructions stored thereon that, when executed by a processor, causes the processor to perform operations comprising: obtaining a first version of a sound mix; extracting first audio features from the first version of the sound mix extracting video features from video corresponding to the first version of the sound mix; obtaining mixing metadata; and automatically calculating with a trained model, using at least the mixing metadata, the first audio features, and the video features: second audio features corresponding to a second version of the sound mix; or pulse-code modulation (PCM) audio or coded audio corresponding to a second version of the sound mix.

In some implementations, automatically calculating with the trained model the second audio features or the PCM audio or the coded audio, comprises: automatically calculating with the trained model the second audio features; and the operations further comprise: deriving the second version of the sound mix using at least the second audio features.

In some implementations, automatically calculating with the trained model the second audio features or the PCM audio or the coded audio, comprises: automatically calculating with the trained model the PCM audio or the coded audio.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figure 1:
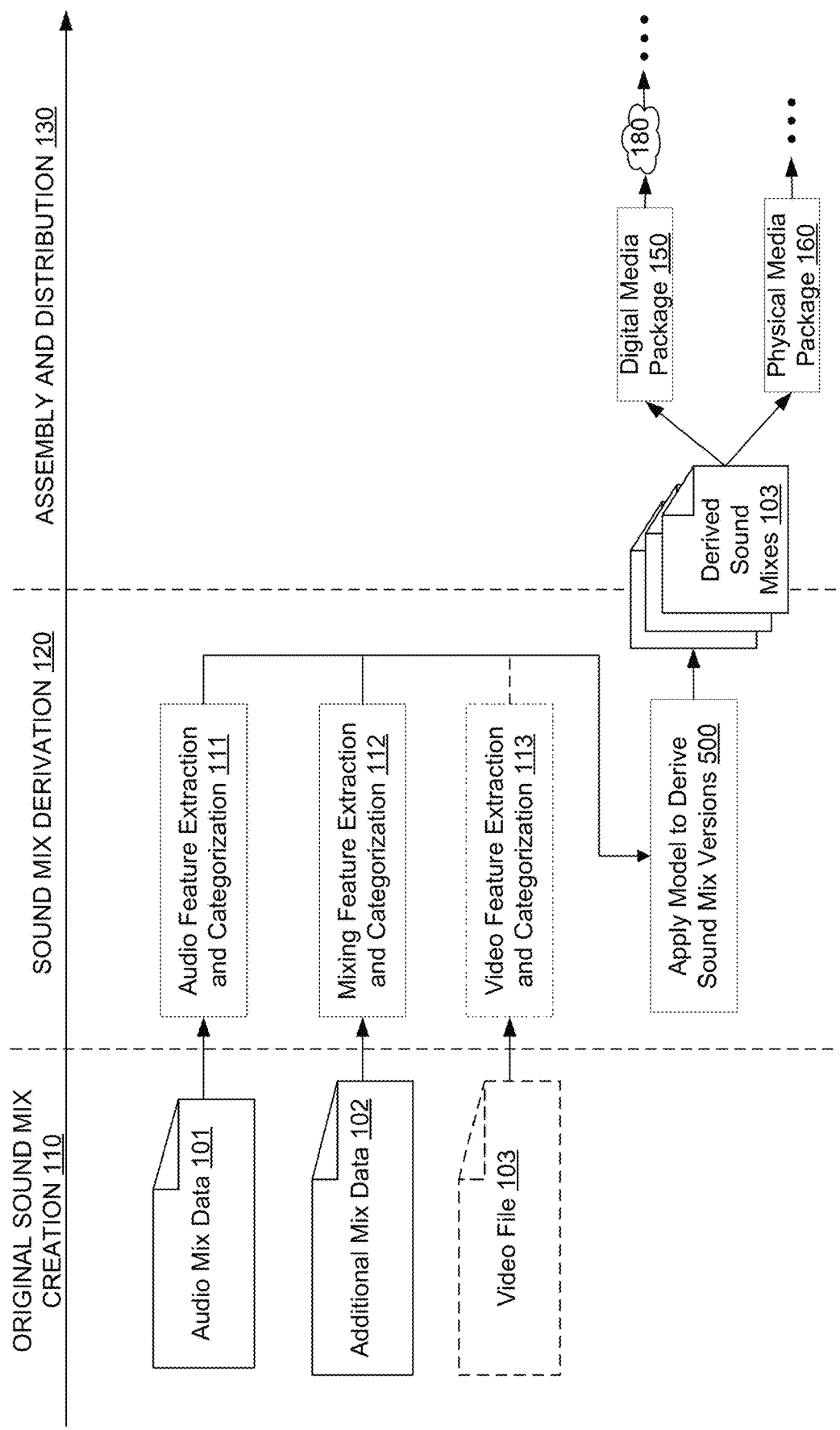
FIG. 1 illustrates a process flow for creating and distributing sound mixes, in accordance with implementations of the disclosure.

The figures are not exhaustive and do not limit the disclosure to the precise form disclosed.

DETAILED DESCRIPTION

After production of media content such as a movie, television show, or television/episodic series, or other media production including an aural component, many different versions of sound mixes may need to be created for the media content to account for various distribution channels. For an original movie sound mix (e.g., mix of dialogue, music, and sound effects) that is created in English in a DOLBY ATMOS theatrical format, derivative sound mixes may need to be created in other formats (e.g., DOLBY ATMOS home, 5.1 surround sound, 7.1 surround sound, DTS-HD, Stereo, Binaural, etc.), other languages (e.g., Spanish, Mandarin, Cantonese, etc.), for physical or digital media distribution, or some combination thereof.

For example, consider a final sound mix of an animated film that is initially released to theaters. After the film's release to theaters, the sound mix may be made available on different digital media streaming services (e.g., AMAZON, NETFLIX, DISNEY+) and physical media (e.g., BLU-RAY disc). In such a scenario, it may not be sufficient to repurpose a theater sound mix for a home speaker system because the home speaker system will perform much differently (e.g., different frequency response for different frequency ranges, different sensitivity, fewer number of speakers, etc.) As such, the original sound mix may need to be modified to create a derivative sound mix that is suitable for a particular playback format and/or a particular set of speakers (e.g., typical home speakers, or speakers built into a device).

Presently, the creation of different versions of a sound mix that comply with multiple distribution specifications is primarily a manual process that entails real-time, manual mix adjustments and processing. For example, a re-recording mixer may be tasked with conforming the soundtrack to given specifications while maintaining original sonic characteristics approved by filmmakers. As part of this task, the re-recording mixer may need to consider technical specifications such as frame rates, sampling rates, territory (e.g., language), destination format (e.g., broadcast, home theater, over-the-top (OTT)), audio playback format (e.g., ATMOS, 7.1, 5.1, stereo, mono, etc.), broadcast chain limitations (e.g., operating levels, energy saturation), audio band spectral balance (e.g., mixed for mobile v. theater), loudness (e.g., playback capabilities of different devices and optimal levels), etc. Such an individual may spend many days in a small studio room listening to different speaker system configurations on different loudness settings to determine, for example, if human dialogue is understandable when movie sound effects and/or music are loud.

With the growing quantity of required versions of sound mixes, multiple problems are presented by current techniques for creating different sound mixes. One problem presented by current techniques is that although many required versions are created via technical transfer, current tools only allow for manual manipulation with human input. A second problem is that the time available for creative collaboration between sound mixers and filmmakers has been reduced due to reduced production timelines. A third problem is that multiple quality control passes by the same human listener introduces the potential for missed and/or false positive error recognition. A fourth problem is that the configurations of sound equipment necessary to produce each possible version of a sound mix for testing is becoming more costly. A further problem is that it is not feasible to predict every potential destination format for a sound mix, particularly with the rising trend of audience-personalized experiences.

Some systems and methods for addressing these problems are described in U.S. Pat. No. 10,445,056 ('056 Patent), which describes the use of a model trained on audio feature data of sound mixes to automate the process of sound mix creation. As described in the '056 Patent, a system for automating sound mix creation may include one or more of the following components: a component to extract metadata categorizing/identifying the input sound mix; a component to extract audio features of the input sound mix; a component that uses a trained model to compare the extracted audio features of the input sound mix with extracted audio features of previously analyzed sound mixes to calculate audio features of a target sound mix; and a component to perform signal processing to derive the target sound mix given the calculated audio features.

The audio features that are extracted may represent sonic and content components of the soundtrack. These features may be extracted via signal processing tools, operating on audio signals of a training library set to derive quantifiable data about the audio content. Such tools may look at aspects such as frequency spectrum, phase coherence, volume/gain dynamic range, spatial energy, and/or waveform shape. The output from these signal processing tools may represent an attempt at decoding the human sound mixing decisions from the audio. This may be challenging when multiple source audio signals are summed to a single output, creating an aggregate with content masking other components within the soundtrack. Additionally, while signal analysis tools may yield data about an audio soundtrack, each component of such analysis may be siloed from one another. Moreover, the output data decoded by signal processing tools may contain high amounts of noise.

A more direct way to obtain human sound mixing decisions of a given audio soundtrack may involve examining the data created by tools used during the creative mixing process. Sound mixing hardware consoles and software provide "channel automation"—time-domain control values for each audio processing component for each audio channel. Because the majority of audio mixing systems provide this feature, automation data may be available for soundtrack mixes completed in at least the last two decades. This data may represent a human mixer's decision to apply specific audio processing at a given time window, which may be ingested more directly as machine learning training data, rather than decoded from the audio soundtrack itself.

Implementations of the disclosure are directed to leveraging historical mixing console channel automation data to develop and use a model trained on mixing console data of sound mixes to automate the process of sound mix creation. The trained model may take as an input audio data of an input sound mix (e.g., a theatrical presentation of a sound mix), and generate as an output mixing console data of a versioned sound mix (e.g., a home presentation of a sound mix designed for a particular surround sound standard). During the process of creating a sound mix, the mixing console data output by the model may be input to mixing console software and/or hardware used by a mixer. This may speed up the mixing process and provide a mixer with a starting point for creating a sound mix that may be more effectively fine-tuned and or quality controlled. Alternatively, the mixing process may be fully automated using such a technique. For example, for a heavily time-constrained production, the model may instead directly output a derivative version of a sound mix By virtue of using the response data recorded by mixing console hardware and/or software, technical and artistic decision making may be directly captured in the data domain and used as more meaningful training information in machine learning to discover content-based mixing patterns. This may create more effective inference-based machine learning models (e.g., convolutional neural network) to produce automated soundtrack mixes. Additionally, by implementing a model that may output human readable mixing console data, a human mixer may more effectively and efficiently make modifications to the output of the model, improving the sound mixing process. Moreover, by virtue of automating the process of sound mix creation and leveraging machine learning to create a model of sound mix creation that continuously improves, the automation of the sound mix versioning process may improve over time as the dataset grows, and increase time available for creative collaboration between sound mixers and filmmakers. Furthermore, this may allow for a versioned sound mix creation process to be moved into a head end of a distribution channel (e.g., a streaming service could derive any version of a mix given an original mix). These and other advantages that may be realized from implementing the systems and methods described may be further appreciated from the disclosure.

FIG. 1 illustrates a process flow for creating and distributing sound mixes in accordance with the disclosure. At process 110, an original sound mix is created. The original sound mix may be the first sound mix created for a film (e.g., sound mix for theater release), a television show, a television series, or other media production including an aural component. The original sound mix may include audio mix data 101 including sounds that are directly captured (e.g., using a microphone), digitally created (e.g., using sound generation software), and/or edited prior to media production (e.g., prior to filming), during media production (e.g., during filming), and/or after media production (e.g., after filming/during post-production). The created sound mix may be created as either a single combined mix, or as a multiple stem mix. Multiple stems (e.g., submixes), when combined, create the composite sound mix. For example, in the case of a film, a stem sound mix may comprise separate stems for dialogue, music, and sound effects. In some cases, additional stems (e.g., separate stems for each voiced character) may be utilized. The stems are the final creative version of this particular format of the mix in that the elements of dialogue, music, and sound effects are unlikely to change.

During the process of creating original sound mix 101, additional mix data 102 may be captured. The additional mix data 102 may include mixing console data input into a mixing console during creation of the original audio mix 101. The mixing console may refer to the hardware and/or software that a mixer uses during sound mix recording and reproduction. For example, it may include an electronic device including multiple controls that may be engaged or disengaged by a human operator to affect sound and drive signal processing. Such controls may be used to affect parameters such as equalization, spatial panning, signal summing, and dynamic range controls. Such parameters are typical of controls used to drive creative processing and manipulation of a given audio signal.

The mixing console data may refer to the channel automation data captured from actuation of software and/or hardware controls of the mixing console during its use. This audio channel automation data may include time-domain control values for each audio processing component for each audio channel. For example, an audio channel with primarily spoken dialogue may have its gain adjusted using the manual console fader control for a particular word or phrase to increase intelligibility. As another example, a specific frequency band audible in the music audio channel may interfere with and mask a given important sound effect. In this case the mixer may engage the equalizer control for a time period; filtering the offensive frequencies from the music audio channel. As a further example, when creating soundtracks with less channels (e.g., downmixing from Atmos to 5.1) the spatial panning controls may be used to maintain the original spatial intent in the new target format.

The channel automation data may be stored in one or more output files corresponding to the original sound mix. As such, during the creation of an original sound mix 101, a time series of values for each audio processing component of each audio channel (e.g., recorded numerical data generated by each control) of an original sound mix may be captured. Such data may be used as target data during training and testing of model that is configured to output mixing console feature data for a versioned sound mix.

The additional mix data 102 may also include mixing metadata associated with the mixing process. For example, the mixing metadata may categorize a type of mixer associated with the sound mix.

A video file 103 corresponding to the original sound mix 101 may also be used in conjunction with the process 110 of creating the original sound mix. For example, the spatial orientation, position and trajectory of objects for a given set of video frames may inform how the audio mix data 101 is derived.

Following creation of the original sound mix, a plurality of sound mixes 103 may be derived by using a process 500 that applies a model to derive sound mix versions. Prior to applying the model, audio feature data may be extracted from audio mix data 101 and categorized (operation 111), mixing feature data may extracted from additional mix data 102 and categorized (operation 112), and, optionally, video feature data may be extracted from video file 103 and categorized (operation 113). The model may take as an input, extracted audio feature data and mixing metadata, and output mixing features (e.g., mixing console data) corresponding to a derivative version of the sound mix. In some optional implementations, the model may also receive video features as an input. The mixing console feature data output by the model may be used to automatically (e.g., by directly feeding the calculated data into a mixing console) or semi-automatically (e.g., with mixing operator feedback) create a derivative sound mix.

In some implementations described herein, mixing console data associated with the original sound mix may be used to perform reinforcement learning or otherwise train the model. However, it is also contemplated that mixing console data may itself be used as an input to the model to derive mixing data of a derivative version of a sound mix.

Following derivation of sound mixes 103, at step 130, the derived sound mixes may be assembled into a media package for distribution. For example, one or more derived sound mixes 103 may be assembled and synchronized with video for distribution.

In some implementations, the derived sound mixes 103 may be distributed as part of a digital media package 150 over a communication medium 180. Communication medium 180 may use one or more suitable communication methods for delivering the digital media package 150, including, for example, satellite communications, cellular communications, fiberoptic cable communications, coaxial cable communications, free space optical communications, or some combination thereof.

For example, a digital media package 150 may be streamed or downloaded over a content delivery network including file servers for storing instances of digital media package 150 and web servers for delivering the stored instances of package 150. As another example, digital media package 150 may be distributed as digital cinema files to a theater over a communication network. After ingesting the digital media 150, a theater may then present it in an auditorium. In digital media distribution implementations where a derived sound mix 102 is in accordance with the Digital Cinema Initiatives, LLC (DCI) Specification, for instance, the sound mix 102 may comprise digital audio track files that are assembled into a digital content package (DCP) including the audio track files, image track files, and a composition playlist including a time code index specifying the order and playback times of the track files.

In some implementations, the derived sound mixes 103 may be distributed as part of a physical media package 160. For example, one or more derived sound mixes 103 may be stored on an optical disc (e.g., BLU-RAY disc), a flash drive, or other physical media drive that may store media content including a derived sound mix 102.

Figure 2:
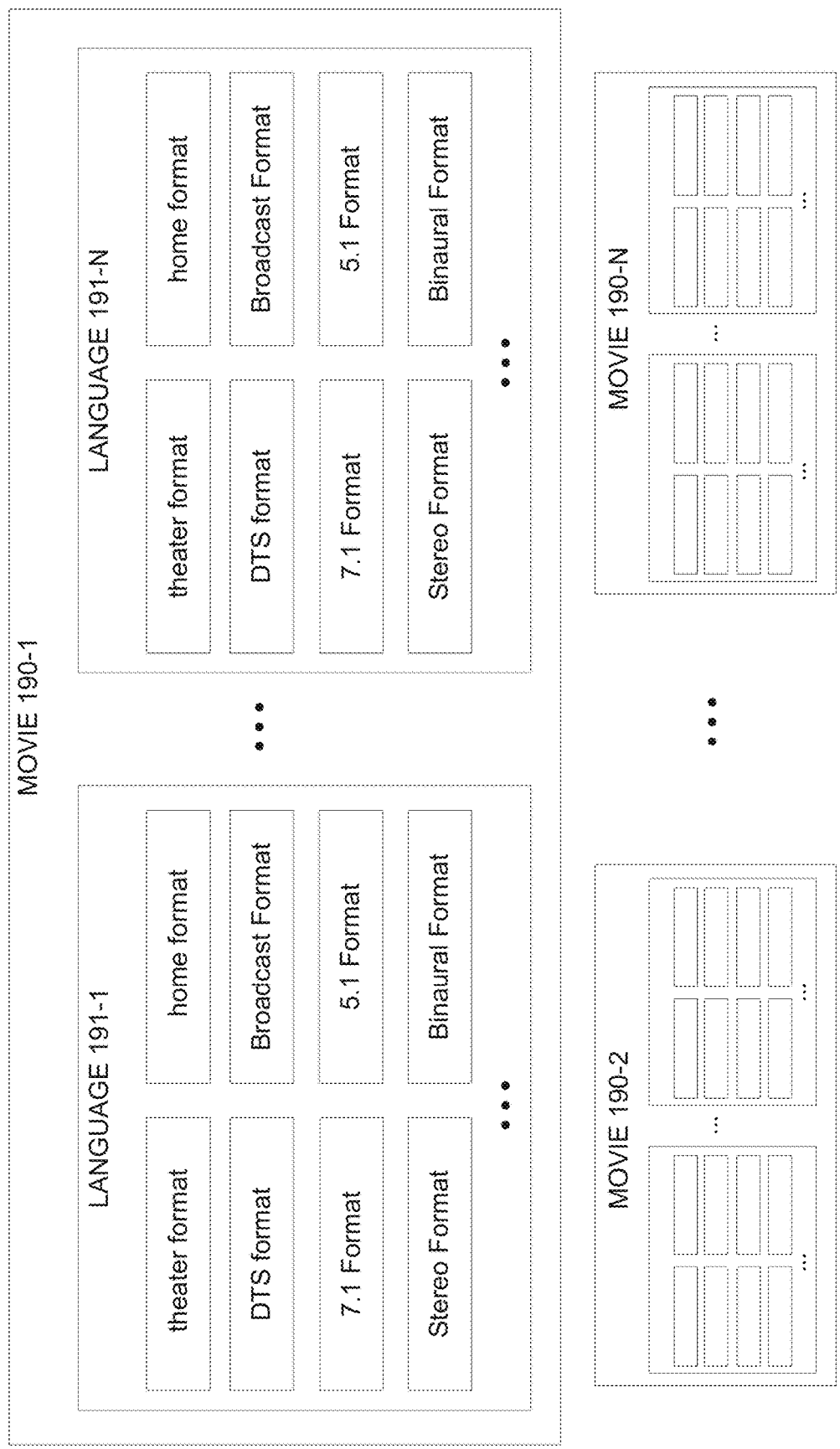
FIG. 2 illustrates an example record of data for sound mixes for movies that may be stored in one or more datastores.

In various implementations, one or more datastores containing a prior record of data associated with sound mix versions for different media content items (e.g., mixing audio data, mixing console data, metadata, and/or video data for different movies and/or television shows) may be leveraged to build a model for automatically deriving mixing console data given audio feature data and mixing metadata of an original or input sound mix. For example, a producer or distributor may leverage decades of soundtracks, and their associated data, that have been produced for films and/or television series. FIG. 2 illustrates an example record of data for sound mixes for movies 190-1 to 190-N (individually referred to as a movie 190) that may be stored in one or more datastores. For a given movie 190, sound mix versions having associated mixing console data may be created for various languages 191-1 to 191-N (individually referred to as a language 191). For a given language 191, a sound mix version may have been created in each of a DOLBY ATMOS theatrical format, a DOLBY ATMOS home format, a DTS format, a broadcast format, a 7.1 Format, a 5.1 Format, a Stereo format, a Binaural format, or some other suitable audio format.

Figure 3:
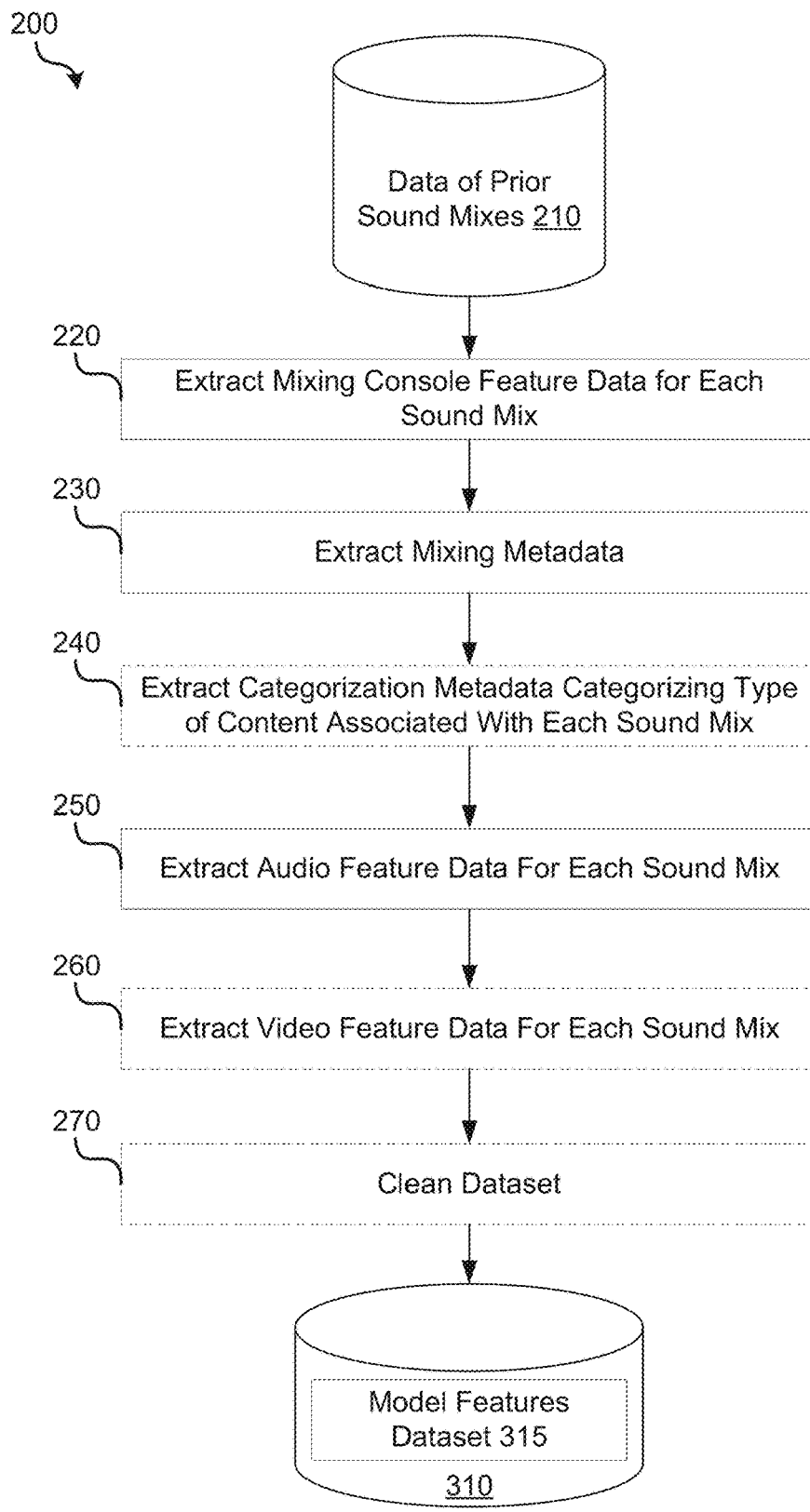
FIG. 3 is an operational flow diagram illustrating an example method for leveraging datastores including data of prior sound mixes to build a model features dataset for constructing a model, in accordance with implementations of the disclosure.

FIG. 3 is an operational flow diagram illustrating an example method 200 for leveraging datastores including data 210 of prior sound mixes to build a model features dataset 315 for constructing a model, in accordance with implementations of the disclosure. As discussed above, the datastores may store a record of mixing console data of original and derived sound mixes, along with the sound mix data. In some implementations, the datastores may also store video data associated with the sound mixes. It should be noted that operations 220-270 of method 200 may be performed in any suitable order. In some implementations, method 200 may be performed without operations 240 and 260-270.

At operation 220, mixing console feature data is extracted for each sound mix version of each media content item. The mixing console feature data may be extracted from a mixing console output file accompanying a given sound mix file. Each feature extracted from the data may comprise console automation data including a time series of values associated with a given control (e.g., level, gain, equalization, panning position, classified activity etc.). This data may be parallel numerical representations, in the time domain, of signal processing controls. The mixing console feature data may be represented at the individual channel level, as well as at a group level; denoting relational qualities between individual channels and subgroups of channels.

In accordance with implementations, further described below, the extracted mixing console feature data may be a target output of the model. However, it is contemplated that the mixing console feature data may also be used as an input of the model.

At operation 230, mixing metadata is extracted. The mixing metadata may be extracted from a mixing console output file accompanying a given sound mix file. Alternatively, the mixing metadata may be input independently from the console data. The extracted mixing metadata may identify a mixer that created the mixing console data. If multiple mixers were involved, the extracted mixing metadata may also identify which channels/stems were allocated to a given mixer.

The extracted mixing metadata may also identify the type/format of the sound mix (e.g., DOLBY ATMOS theater, DOLBY ATMOS home, 5.1, 7.1, Stereo, Binaural, etc.). Further, at operation 240, the mixing metadata may identify whether the sound mix is the original/parent sound mix or a derivative sound mix.

At operation 240, categorization metadata categorizing the type of content associated with each sound mix is extracted. For example, categorization metadata may be extracted that identifies a production studio, a genre, a filmmaker, a type of media content (e.g., feature film, animation film, short, teaser, television episode, VR content, etc.), or other feature of the content associated with the sound mix. In some implementations, the categorization metadata may be extracted from a digital media package 150 including the sound mix. In implementations, categorization metadata may be extracted via the use of an accompanying sidecar descriptive metadata file, from data contained within the header of the digital audio files of the sound mix, and/or from an embedded digital token/watermark.

At operation 250, audio feature data identifying the audio characteristics of each sound mix is extracted for each sound mix version of each media content item.

In implementations, one or more of the following categories of audio feature data may be extracted for each sound mix (e.g., originals and derivatives for each media production): (i) audio levels; (ii) audio spectral balance (e.g., frequency balance); (iii) audio spatial balance; and (iv) audio content identities. While four illustrative categories of audio feature data that may be extracted are described herein, it should be appreciated that other categories/types of audio feature data may be extracted.

For audio levels of a given sound mix, one or more of the following subcategories of audio level data may be extracted: short term (momentary) and long term loudness (e.g., loudness, k-weighted, relative to full scale (LKFS)), loudness or dynamic range (LRA), relative loudness of each program element (e.g., dialogue versus music), peak levels in decibels relative to full scale (dbFS), and immersive soundfield loudness (e.g., perceived listener envelopment in LEV). It should be appreciated that the following subcategories of audio level data that may be extracted are illustrative, and that other subcategories of audio level data may be extracted. In some implementations, feature data for audio levels may be extracted by the means of amplitude analysis of digital audio files, referenced over time or individual sample-based.

For audio spectral balance of a given sound mix, one or more of the following subcategories of audio spectral balance data may be extracted: distribution of energy across frequency spectrum measured temporally, relative balance between different audio frequency components (e.g., highs, lows, bass, treble, etc.), compact descriptions of the power spectrum (e.g., MFCCs Mel-frequency cepstral coefficients), and spatial distribution of audio spectral energy. It should be appreciated that the following subcategories of audio spectral balance data that may be extracted are illustrative, and that other subcategories of audio spectral balance data may be extracted. In some implementations, data for audio spectral features may be extracted from digital audio files using techniques such as Fast Fourier Transform, Spectrogram generation from bandpass filtering, and Deconvolution.

For audio spatial balance of a given sound mix, one or more of the following subcategories of audio spatial balance data may be extracted: perceived width of sound elements (e.g., apparent source width (ASW)), element group's soundfield usage, correlation of overhead channels to azimuth/ear level. It should be appreciated that the following subcategories of audio spatial balance data that may be extracted are illustrative, and that other subcategories of audio spatial balance data may be extracted. In some implementations, data for audio spatial balance features may be extracted via mathematical analysis of digitally-sampled audio signals using acoustic measurements such as interaural cross-correlation, signal phase comparisons, signal correlation measurements, ambisonic modeling, interaural time difference and interaural intensity difference.

For audio content identities of a given sound mix, one or more of the following subcategories of audio content identities may be extracted: identification of dialogue, cloth (e.g., non-native extraneous noises contained in a dialogue track), international dialogue, special effects vocalizations, scored music, source music, and discrete sound effects. In some implementations, the extracted audio content identities may identify what percentage of the sound mix includes music, what percentage includes dialogue, and/or what percentage includes sound effects. It should be appreciated that the following subcategories of audio content identities that may be extracted are illustrative, and that other subcategories of audio content identities may be extracted. In some implementations, data for audio content identities may be extracted via automatic audio matching, audio fingerprinting, timbral signature datastore comparison, hidden Markov models, and other machine learning models to predict and identify the digitally-sampled audio signal.

Although example method 200 illustrates the extraction of four types of data that are subsequently used in model creation and training: i) mixing metadata; ii) mixing console feature data of a sound mix; iii) sound mix categorization metadata; and iv) sound mix audio feature data, it should be appreciated that the systems and methods described herein may alternatively be implemented using only the extracted mixing console feature data and mixing metadata.

At operation 260, video feature data is extracted for each sound mix version of each media content item. The video feature data may include video frames or may generated from video frames. The video data, when used as an input to a trained model that predicts a target output audio feature and/or console data, may enhance the model as the spatial orientation of objects in an image and their movements in relation to an audio source may inform how a sound mix is derived.

At operation 270, the extracted data may be cleaned or normalized. For example, the mixing console feature data, audio feature data, and/or mixing metadata may be cleaned and normalized. Additionally, categorization metadata and/or video feature data may be cleaned or normalized in implementations where such data is also used to develop a model. For example, in some implementations, categories of mixing console feature data may be merged into a single feature. As another example, categories of audio feature data or mixing console feature data that are less likely to contribute to the aural qualities of a sound mix may be removed or weighted with less priority from the dataset to focus the subsequent machine learning process on training data including key features that are likely to contribute to the aural qualities of a sound mix. Similarly, data may be spectrally filtered and weighted to mimic human aural perception. In some implementations, categories of mixing console data may be split into multiple features. It should be noted that cleaning operation 270 may be performed concurrently with operations 220-260 or after operations 220-260.

Following extraction, the extracted data may be stored/cataloged in a datastore/features library 310 as a model dataset 315 that may be used to train and test one or more machine learning models. In some implementations, a model may be created that predicts or otherwise outputs mixing console feature data of a second version of a sound mix given the following input data of a first version of a sound mix: audio feature data, mixing metadata, and, optionally, categorization metadata and/or video data. In some implementations, a model may be created that predicts or otherwise outputs second audio feature data of a second version of a sound mix given the following input data of a first version of a sound mix: audio feature data, mixing metadata, and, optionally, categorization metadata and/or video data. In yet further implementations, a model may be created that predicts or otherwise outputs second mixing console feature data of a second version of a sound mix given the following input data of a first version of a sound mix: first mixing console feature data, audio feature data, mixing metadata, and, optionally, categorization metadata and/or video data.

It should be noted that process 200 may be iterated over time to refine the dataset used to train and test the aforementioned models. For example, over time it may be discovered that certain categories of feature data are more likely to be indicative of the aural qualities of an original sound mix and its derivatives. Further, as new sound mixes (e.g., originals and derivatives) are created and distributed, the model dataset 315 may be expanded. As such, it should be appreciated that the features, categorization, and size of the dataset 315 may change over time.

Figure 4:
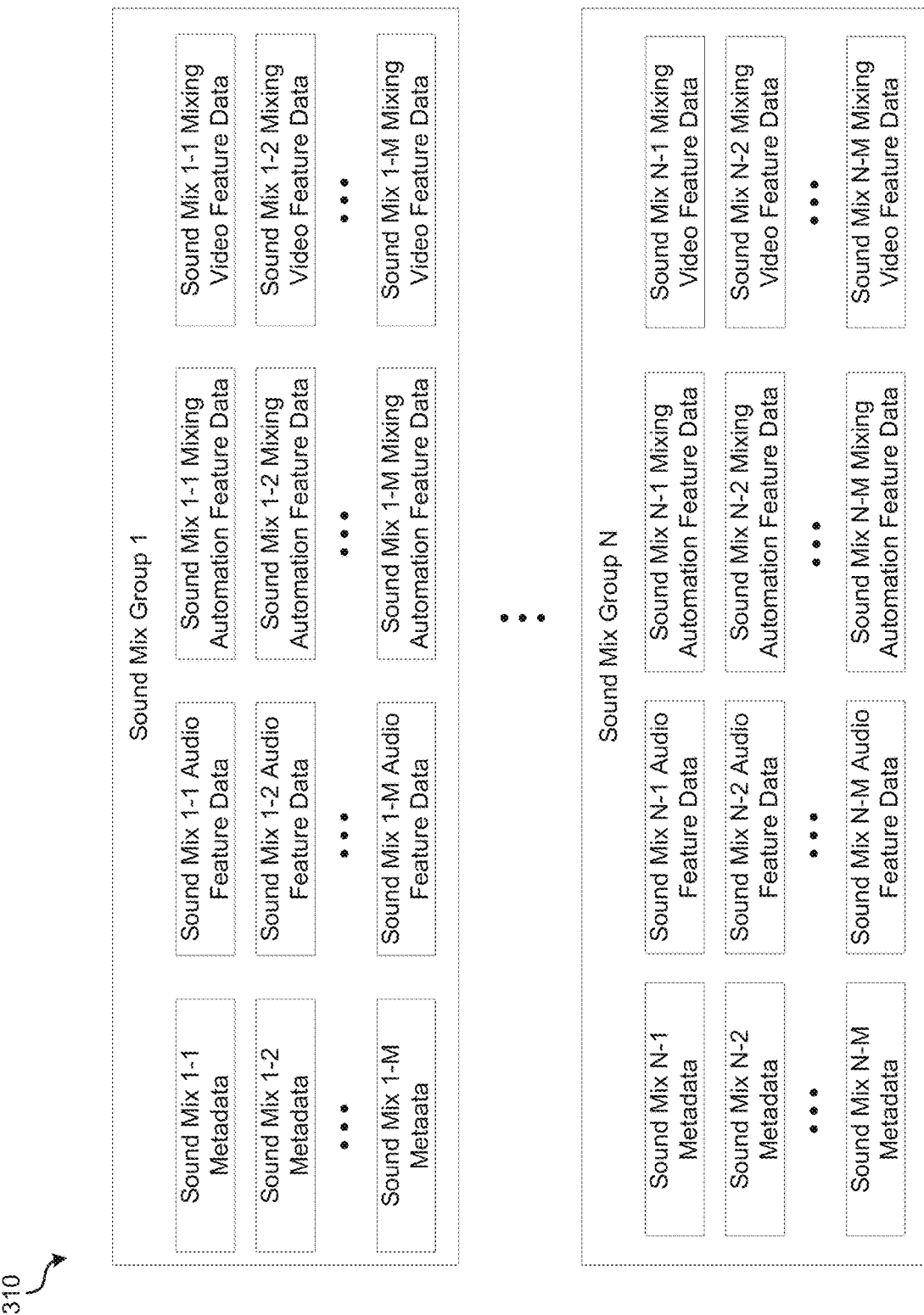
FIG. 4 is a block diagram illustrating a simplified representation of an example model dataset, in accordance with implementations of the disclosure.

FIG. 4 is a block diagram illustrating a simplified representation of an example model dataset 315, in accordance with implementations of the disclosure. As illustrated in this example, the dataset may be grouped into N groups, where each group corresponds to extracted metadata (e.g., mixing metadata and/or categorization metadata), mixing console feature data, audio feature data, and video feature data for a particular media content (e.g., a movie or television show). In the illustrated example, mixing console feature data, metadata, audio feature data, and video feature data are extracted for M sound mixes for each media work. As noted above, in some instances, the extracted categorization metadata may identify whether a sound mix is an original or derivative. As such, each sound mix group may be further organized into a known input (original sound mix) and known outputs (derivative sound mix(es)).

In addition to grouping the dataset as discussed above, the dataset may be further divided to specify the target data and the input data. The target data may represent the data that a model is trained to predict, and the input data may represent the data input to the model to make the prediction.

Figure 9A:
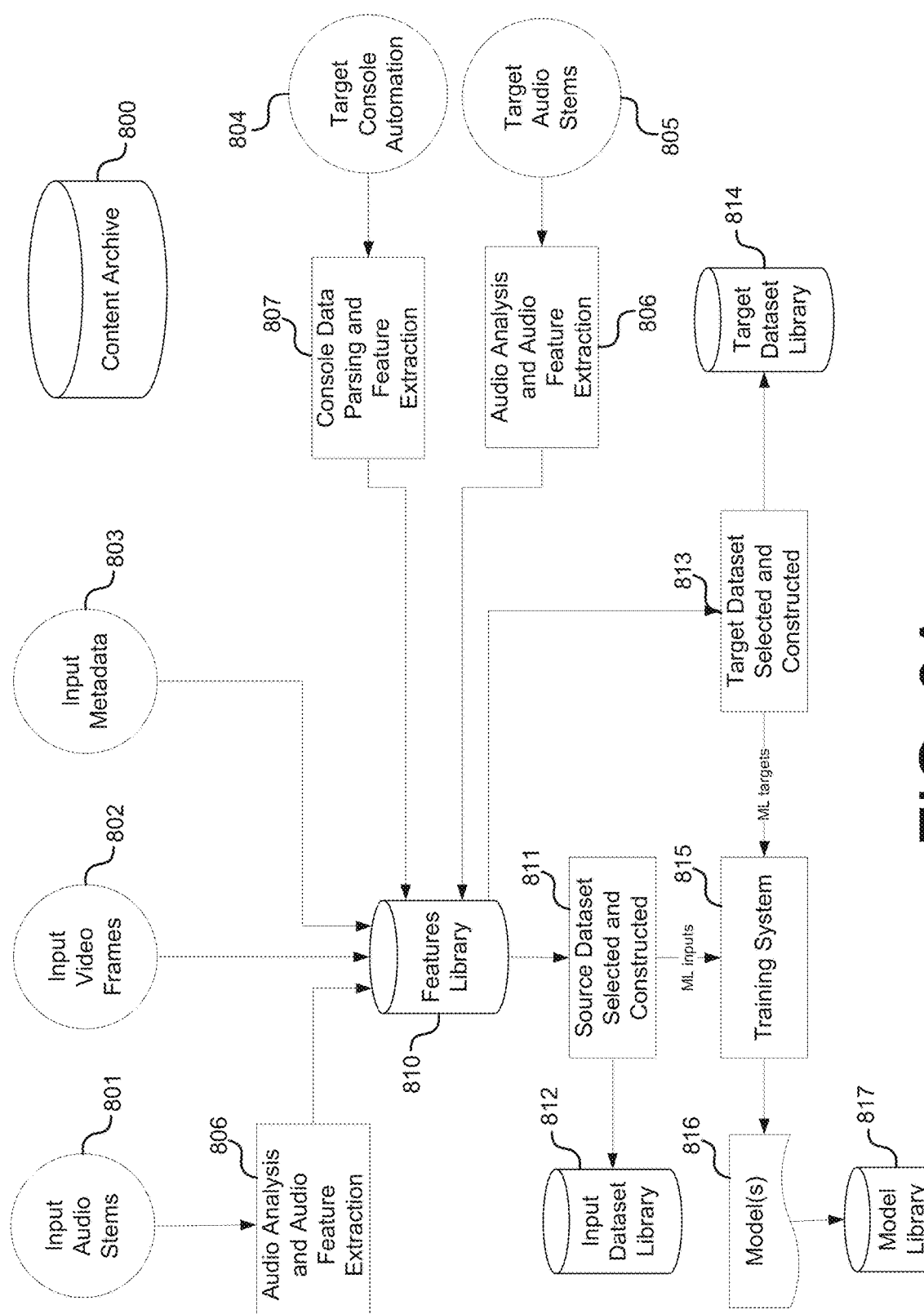
FIG. 9A is a flow diagram illustrating a particular example of preparing datasets for constructing one or more models that predict console automation data or audio stems of a sound mix, in accordance with implementations of the disclosure.

FIG. 9A is a flow diagram illustrating a particular example of preparing datasets for constructing one or more models that predict console automation data or audio stems of a sound mix, in accordance with implementations of the disclosure. In this example, a content archive 800 may store historical data associated with sound mixes, including audio stems, video frames, console automation data, and metadata (e.g., mixing metadata and/or categorization metadata as discussed above).

To prepare a dataset for constructing one or more models 816, data obtained from content archive 800 includes both inputs and targets. The inputs may include input audio stems 801, input video frames 802, and input metadata 803. Audio analysis and audio feature extraction (operation 806) may be performed on the input audio stems 801 (e.g., as discussed above with respect to operation 250) to extract input audio feature data. The inputs, including the processed input audio feature data are fed into a features library 810.

In some implementations, the input metadata 803 includes mixer metadata identifying a type of mixer or a specific mixer. For example, numerical identifiers or names of mixers or types of mixers may be used. By virtue of including this metadata as part of model construction, stylistic information of different mixers or types of mixers may be encoded into the model. This may allow a user during inference time (application of the model), the ability to provide a desired ID or name for the target individual mixer to generate a model output (e.g., console automation data or audio feature data) in accordance with that individual's mixing style.

The targets may include target audio stems 805 and target console automation data 804. In some implementations, as new console automation data is generated using a model 816, such data may be used as additional target console automation data 804 to perform reinforcement learning. In some implementations, the input audio stems 801 include first/original versions of a sound mix, and the target audio stems include derivative versions of sound mixes. Audio analysis and audio feature extraction (operation 806) may be performed on the target audio stems 805 to extract target audio feature data. Console data parsing and future extraction (operation 807) may be performed on the target console automation data 804 (e.g., as discussed above with respect to operation 220) to extract target console automation feature data. The targets, including the processed target audio feature data and processed target audio feature data, are fed into features library 810.

To prepare the model for construction, including training and testing, a source dataset is selected from features library 810 and constructed (operation 811) to form an input/source dataset library 812, and a target dataset is selected from features library 810 and constructed (operation 813) to form a target dataset library 814. The source dataset provides inputs for machine learning, and the target dataset provides targets/outputs for machine learning. The inputs may be selected from the input data described above, and the targets may be selected from the target data described above. In this particular example, a training system 815 is used to build the machine learning model 816(*s*). For example, a convolutional neural network model may be built. In some cases, multiple models 816 may be constructed. For example, a target output of one model may be console automation data, and a target output of another model may be audio stem data. The one or more models 816 may be stored in a model library 817 for future use.

Figure 5:
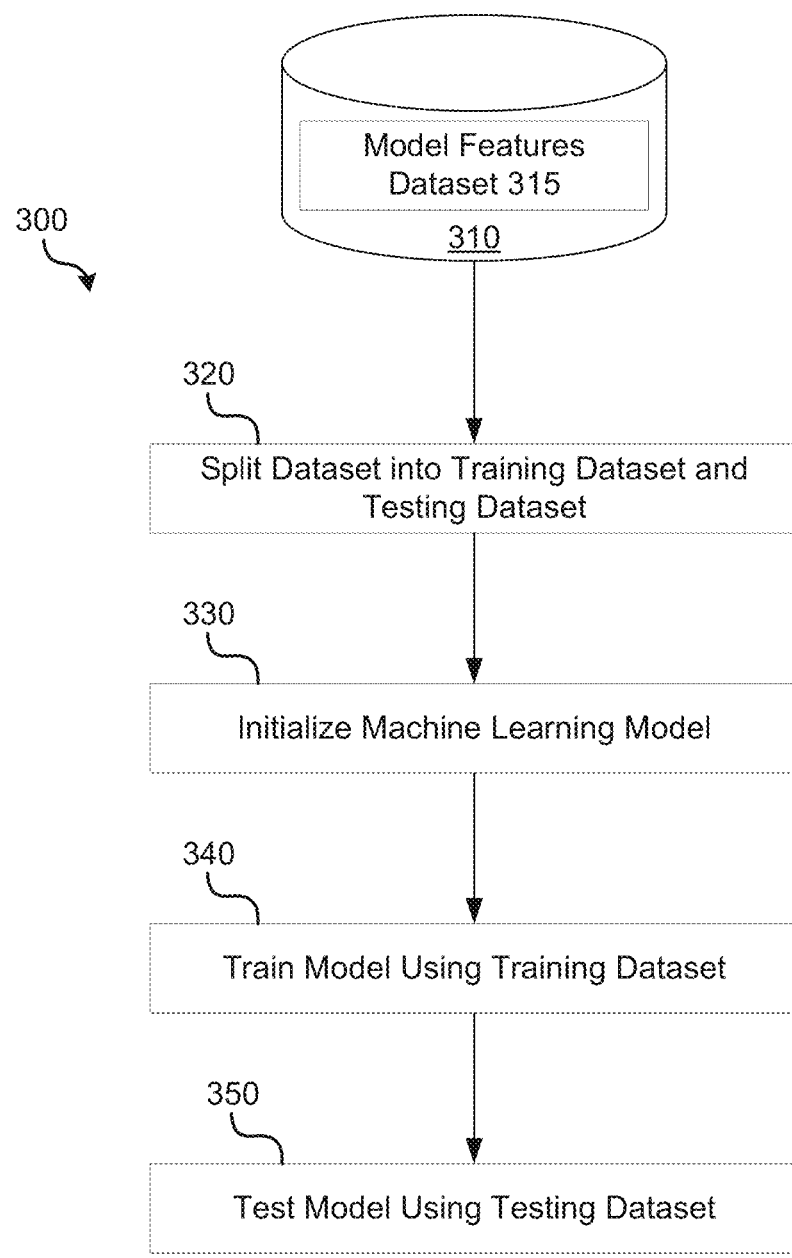
FIG. 5 is an operational flow diagram illustrating an example method for creating, training, and testing one or more models used to derive sound mixes, in accordance with implementations of the disclosure.

FIG. 5 is an operational flow diagram illustrating an example method 300 for creating, training, and testing one or more models used to derive sound mixes, in accordance with implementations of the disclosure. At operation 320, extracted model features dataset 315 stored in a datastore 310 may be split into a training dataset and testing dataset. In implementations, each of the training dataset and testing dataset may comprise a subset of known sound mix inputs (e.g., audio feature data of original/parent sound mix, metadata, and/or video data) and associated outputs/targets (e.g., mixing console data and/or audio feature data of derivative sound mixes). In implementations, the training dataset may comprise a majority of the dataset (e.g., 60%, 70%, 80%, etc.). In implementations, the datasets may be randomized, prior to splitting, to ensure an equal distribution of patterns of data. Using FIG. 4 as an example, 75% of sound mix groups may be randomly selected to be part of the training dataset, with the remaining 25% being randomly selected to be part of the testing dataset.

At operation 330, a machine learning model may be initialized to perform training using the training dataset. The model may be selected to find patterns/trends between mixing console feature data of the same sound mix, to find patterns/trends between mixing console feature data of an original sound mix and a derivative sound mix given metadata categorizing the type of mixers associated with the sound mixes, and to find other patterns/trends in the mixing console feature data of sound mixes that may be used to derive mixing console feature data of a derivative sound mix given audio feature data and metadata of an original sound mix as an input.

In implementations, the model may be initialized by selecting one or more supervised learning algorithms that learn patterns using known inputs and known outputs. For example, a known input may include mixing metadata and audio feature data of an original sound mix, and a known output may include the mixing console features of a derivative sound mix of the original sound mix. As another example, a known input may include mixing metadata, video feature data, and audio feature data of an original sound mix, and a known output may include the mixing console feature data and audio feature data of a derivative sound mix of the original sound mix. As such, relationships between audio feature data of an original sound mix and mixing console data of various derivative sound mixes may be determined. In further implementations, mixing console features (e.g., of an original version of a sound mix) may serve as inputs to the model.

Supervised learning algorithms such as neural networks, linear regression, logistic regression, decision trees, k-nearest neighbors, and/or support vector machines may be utilized. During initialization, hyperparameters of the algorithms may be set. In some implementations, an ensemble model that combines multiple statistical modeling techniques may be utilized. For example, bagging (averaging of multiple models), a bucket of models (using training data to create different models, and then picking the best one), boosting, stacking, or other ensemble model techniques may be utilized. For example, an ensemble model may be based on a combination of independent models developed based on separately considering the mixing console feature data and audio feature data.

In some implementations, unsupervised learning algorithms may be utilized to initialize the model. For example, k-means clustering, principal and independent component analysis, association rules, or other suitable unsupervised learning algorithms may be used. In some implementations, semi-supervised learning algorithms or a combination or supervised and unsupervised learning algorithms may be used.

At operation 340, the model may be trained using the training dataset. For example, using one or more of the aforementioned supervised learning algorithms, a machine may analyze and determine relationships between audio feature data, mixing metadata, and mixing console feature data in the training data to develop a model that may calculate mixing console feature data of a derivative sound mix given audio feature data of an input sound mix. For example, given an input sound mix in a DOLBY ATMOS theatrical format having a particular set of audio stems with associated audio features, the model may calculate what the mixing console data characteristics would be for a derivative sound mix having a DOLBY ATMOS home format.

In some implementations, training may be used to identify trends from technical version requests, trends by studio, trends by filmmaker, trends by genre, trends by intended audience, trends for specific recording mixers, and/or other trends.

At operation 350, the model developed during training may be tested using the testing dataset. For example, given an original sound mix of the testing dataset having a particular set of audio feature data, that audio feature data may be provided to the trained model to calculate mixing console feature data of one or more derivative sound mixes. The mixing console feature data for each derivative sound mix that is calculated by the model may thereafter be compared with the actual, known mixing console feature data of the derivative sound mix in the testing dataset to determine a difference (e.g., mean absolute error) between the calculated/predicted mixing console feature data and actual mixing console feature data.

In implementations, the performance of the model may be calculated from testing as an average error score for all predictions. If the average error score is too high, additional iterations of method 300 (and optionally, method 200) may be performed. For example, hyperparameters of the algorithms used in the model may be adjusted, the algorithms of the model may be changed, and/or different features of data may be considered in the model.

Alternatively, if the mean absolute error is satisfactory (e.g., the mixing console feature data of derivative sound mixes calculated by the model is sufficiently close to the actual mixing console features of derivative sound mixes), the model may be made available to create/derive sound mix versions using original sound mixes (e.g., method 500).

In some implementations of method 300, different models may be trained, tested, and/or developed depending on the categorizations of the sound mixes. For example, separate models may be created to derive mixing console data for animated films and live action films. As another example, separate models may be created to derive mixing console data for television series and movies. As further examples, separate models may be created to derive mixing console data for each studio or to derive mixing console data for each genre of content.

In some implementations of method 300, a cross validation process may be performed whereby training and testing data is split into various combinations and trained and tested in these various combinations. For example, an exhaustive cross validation or k-fold validation process may be performed.

Figure 6A:
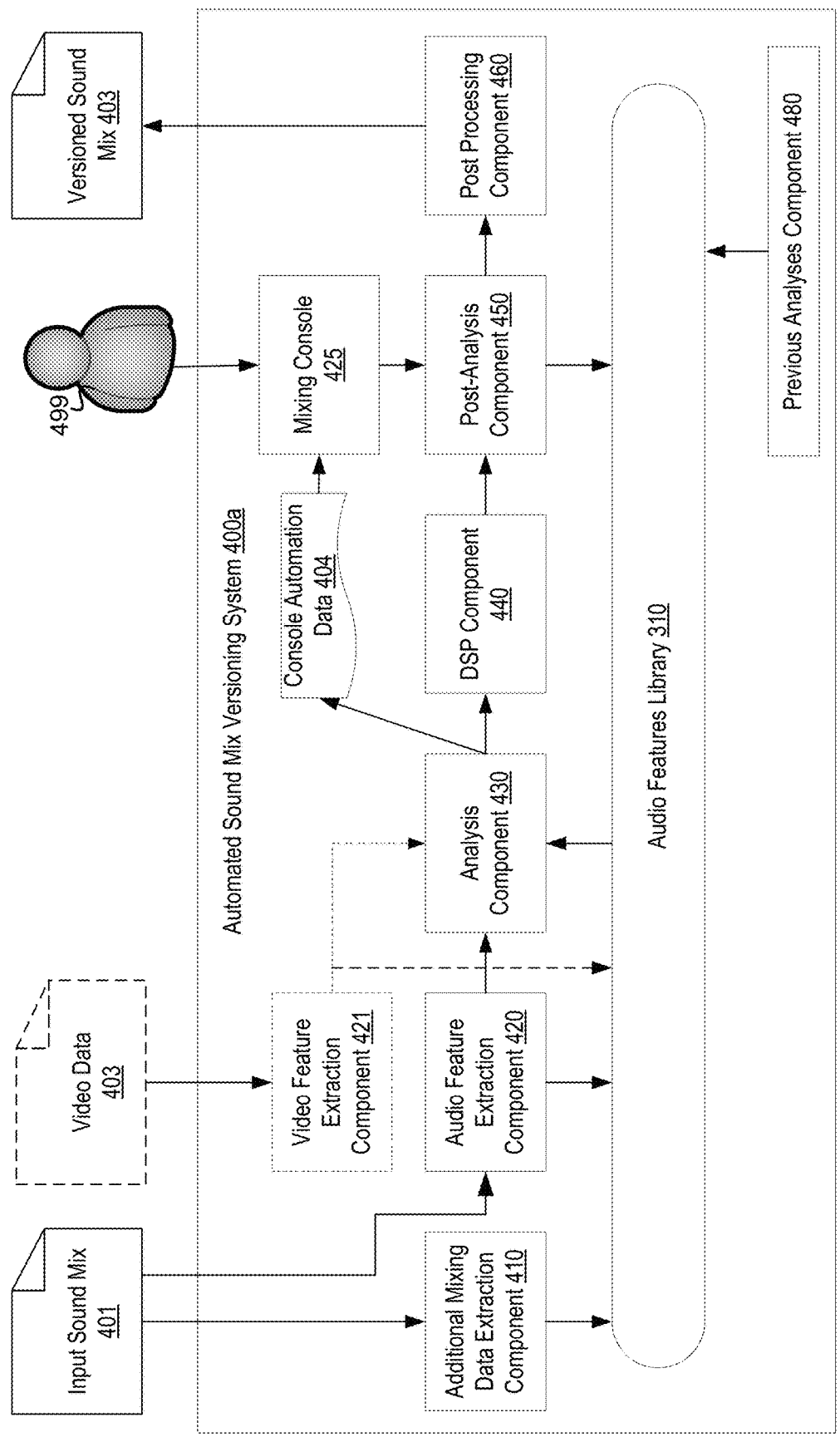
FIG. 6A illustrates an example architecture of components of an automated sound mix versioning system, in accordance with implementations of the disclosure.

FIG. 6A illustrates an example architecture of components of an automated sound mix versioning system 400a, in accordance with implementations of the disclosure. System 400a is configured to take an input sound mix 401 (e.g., audio mix data 101 and additional mix data 102) and output one or more versioned sound mixes 403 (e.g., derived sound mixes 103). For example, system 400 may receive an original stems sound mix of a film having a dialogue stem, a music stem, and a sound effects stem, and output a derivative stems sound mix having a dialogue stem, a music stem, and a sound effects stem. As depicted, system 400a may also, optionally, use video data 403 corresponding to input sound mix 401 as an input for deriving versioned sound mixes.

System 400a may include additional mixing data extraction component 410, an audio feature extraction component 420, video feature extraction component 421, analysis component 430, mixing console 425 operated by mixer 499, digital signal processing (DSP) component 440, post-analysis component 450, post-processing component 460, features library 310, and previous analyses component 480. One or more components of system 400a may be implemented as a software package including executable machine readable instructions. In implementations, system 400a may correspond to a producer or distributor of media content.

As depicted by FIG. 6A, an output versioned sound mix 403 is generated using at least an input sound mix 401, which has audio features extracted by component 420 and entered into features library 310. If mixing console data associated with input sound mix 401 exists, such data may also be extracted using additional mixing data extraction component 410, and entered into features library 310. Such mixing console data may be used to perform additional training (e.g., reinforcement learning) of the model. Extraction of such data may include formatting, cleaning and converting data produced by various hardware and software automation systems, producing controlled numerical data defined in range by a standardized time series. Multiple categories and series of data may be extracted, resampled and realigned.

When analyzed against features library 310, control values for target versioned sound mix 403 may be generated as parameters (e.g., audio features) for DSP component 440 or generated as console automation data 404. If DSP is chosen, the input sound mix 401 may be directly modified by the DSP component 440. Conversely, if console automation is chosen, console automation data 404 suitable for ingest into a mixing console 425 is generated, and signal processing is performed using mixing console 425. This method allows for human intervention and alteration before final post analysis and processing components 450 and 460.

In addition to extracting mixing console data (if it exists), additional mixing data extraction component 410 may be a component for extracting metadata from input sound mix 401. The metadata may include mixing metadata and/or categorization metadata as discussed above. For example, metadata identifying whether the input sound mix 401 corresponds to a particular mixer may be extracted. The mixing metadata may also identify the type/format of the sound mix (e.g., DOLBY ATMOS theater, DOLBY ATMOS home, 5.1, 7.1, Stereo, Binaural, etc.). Additionally, metadata may be extracted that categorizes whether input sound mix 401 is associated with a particular production studio, genre, filmmaker, etc. In some implementations, component 410 may perform its functions in a manner similar to that discussed above with reference to operations 220-240.

In some implementations, additional mixing data extraction component 410 may also be comprised of components for performing basic quality control for digital audio errors (corrupted bits/headers, technical saturation errors, etc.)

Audio feature extraction component 420 may be a component for extracting audio feature data identifying the audio characteristics of input sound mix 401. One or more of the following categories of audio feature data as described above may be extracted for input sound mix 401: (i) audio levels; (ii) audio spectral balance (e.g., frequency balance); (iii) audio spatial balance; and (iv) audio content identities. These audio features may be extracted in a manner similar to that described above with reference to operation 250.

Video feature extraction component 421 may be an optional component for extracting video features from video data 403 (e.g., video frames) associated with input sound mix 401. These video features may be extracted in a manner similar to that described above with reference to operation 260.

The audio feature data, metadata, and video feature data may be measured and cataloged into a features library 310 that includes training data for a model used to automatically generate derivative versions of sound mixes.

Analysis component 430 may be a component for applying one or more machine learning models (e.g., where the models were learned as described above with reference to methods 200-300) to the metadata and audio feature data of input sound mix 401 (and optionally video feature data of video data 403 corresponding to input sound mix 401) to calculate console automation data 404 and/or audio features of a target version (e.g., derivative version) of the sound mix. The model may compare the metadata and audio feature data with previous metadata and audio feature data analyzed by previous analyses component 480 and cataloged in features library 310. For example, given an input sound mix 401 in a DOLBY ATMOS theatrical format and a target sound mix in a DOLBY ATMOS home format, a model may be used to determine an appropriate mapping of audio feature data between the two formats, or an appropriate mapping of audio feature data to console automation data 404 between the two formats.

In some implementations, analysis component 430 may use the metadata to select the type of machine learned model that is applied to the extracted audio feature data of input sound mix 401. For example, different models may be applied depending on the mixer of input sound mix 401, the production studio of input sound mix 401, the content type of sound mix 401 (e.g., animation vs. live action), or based on some other metadata associated with sound mix 401. In some implementations, analysis component 430 may select the type of model that is applied to the extracted audio feature data of input sound mix 401 depending on the audio format of the target version. For example, a different model may applied depending on whether the audio format of the target version includes stereo sound or surround sound. In some implementations, selection of a model from a set of different models may be based on a determination of the model having the lowest error score for one or more of the metadata for the sound mix 401. For example, a particular model may be selected because it has the lowest average error score for mixes having animation and stereo sound metadata.

DSP component 440 may be a component for generating a versioned sound mix given calculated audio features of the target sound mix. For example, DSP component 440 may perform adjustment of the input sound mix 401 to generate the target sound mix. One or more, either static or dynamic, audio spatial adjustments, audio spectral adjustments, audio level adjustments, or other audio adjustments may be performed. By way of example, audio spatial adjustments may include one or more of a desired audio playback format (e.g., summing/upmixing), distributed spatial energy, apparent width of front soundstage, listener envelopment, correlation/decorrelation of content during summing/upmixing, psychoacoustic effect applications, etc. Audio spectral adjustments may include one or more of audio channel spectral balance, spatial spectral energy balance, discrete element spectral balance (e.g., dialogue EQ), bass management, etc. Audio level adjustments may include one or more of momentary and long term perceived loudness, dynamic range, element-specific loudness management and exclusion, etc. In some implementations, input sound mix 401 is an input to DSP component 440, and the calculated audio features of the target sound mix may be used by DSP component 440 to adjust input sound mix 401. In some implementations, mixing console 425 may also output audio features that drive DSP component 440.

Figure 6B:
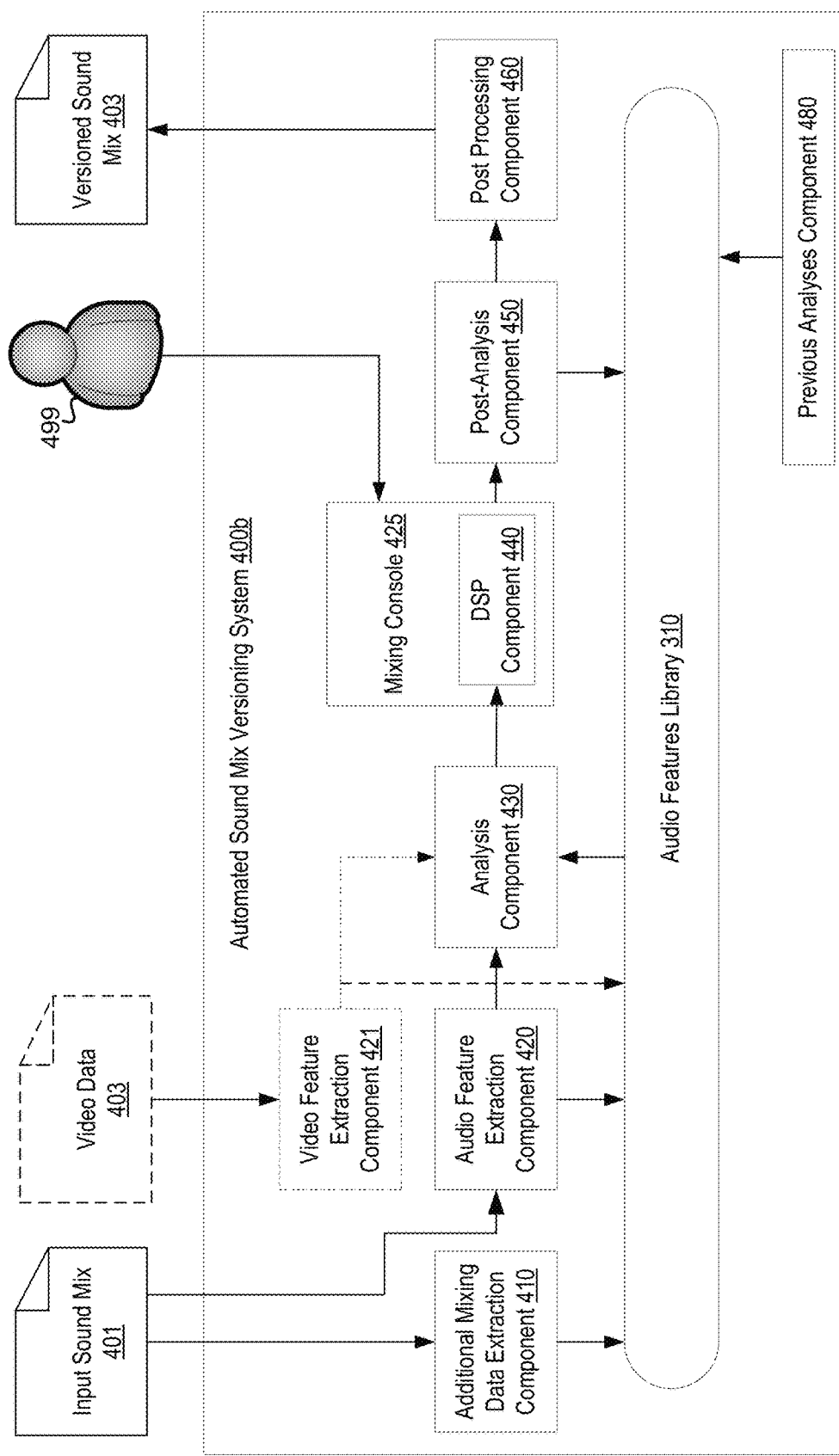
FIG. 6B illustrates an example architecture of components of an automated sound mix versioning system, in accordance with implementations of the disclosure.

In some implementations, DSP component 440 may be integrated in mixing console 425. FIG. 6B depicts an example architecture of components of an automated sound mix versioning system 400b that includes a mixing console 425 with integrated DSP component 440. In this implementation, any audio features output by analysis component 430 may feed into mixing console 425 for DSP. Additionally (or alternatively), mixing console 425 may receive and process console automation data 404 as discussed above.

Figure 6C:
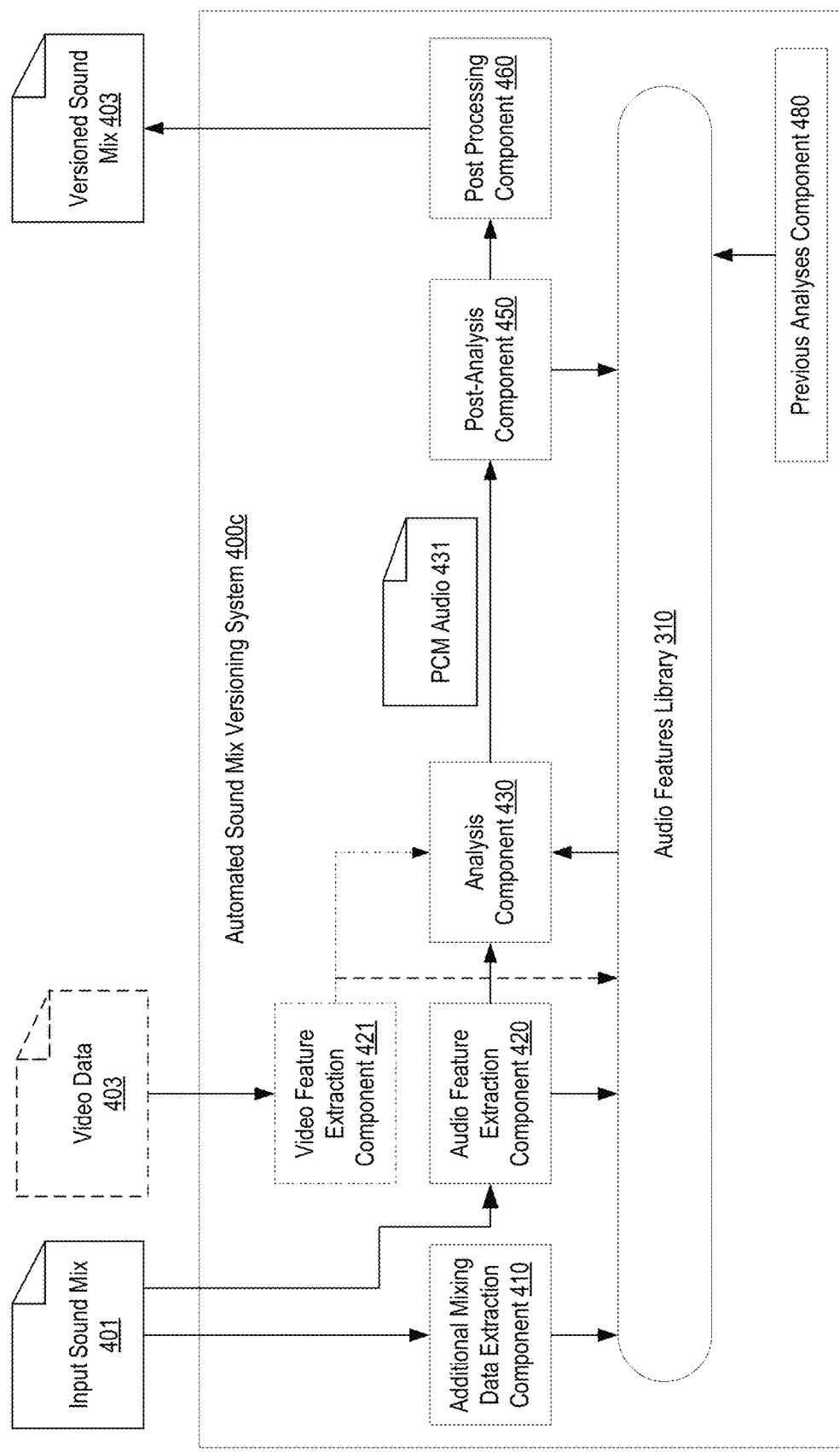
FIG. 6C illustrates an example architecture of components of an automated sound mix versioning system, in accordance with implementations of the disclosure.

In alternative implementations, the model associated with analysis component 430 may be trained to output pulse-code modulation (PCM) audio given a set of inputs. The inputs may include audio features as discussed above. Alternatively, the inputs may include PCM audio (e.g., PCM audio stems of input sound mix 401) or coded audio (e.g., FLAC, WAV, AAC, DOLBY DIGITAL DTS, DOLBY DIGITAL TRUEHD, etc.). In such cases, audio feature extraction component 420 may be bypassed or omitted from system 400c. Additionally, the inputs may include input video frames and input metadata as discussed above. In some implementations, the PCM audio that is output may be in the form of output audio stems. To this end, FIG. 6C depicts an example architecture of components of an automated sound mix versioning system 400c that includes analysis component 430 with a model configured to output PCM audio 431. By virtue of having a model trained to directly output PCM audio 431, DSP component 440 and/or mixing console 425 may be omitted from the process of generating versioned sound mix 403, thereby increasing the efficiency of the process of generating a soundtrack.

Post-analysis component 450 may be a component for ingesting the audio features created for the newly-generated version into features library 310 to further train/refine the machine learning model. The audio features may be directly created using the model or they may be created via mixing console 425 that received console automation data 404 output by the model. In some implementations, post-analysis component 450 may provide an interface for a user to validate the newly-generated version and to provide additional feedback to tune the model.

Post processing component 460 may be a component for processing the newly-generated sound mix version to comply with technical version digital file specifications. For example, the newly-generated sound mix version may be processed to adjust/set a broadcast transmission peak level, a film leader/pop, bars and tone, timecode offset(s), naming, reel joining, etc.

Figure 7:
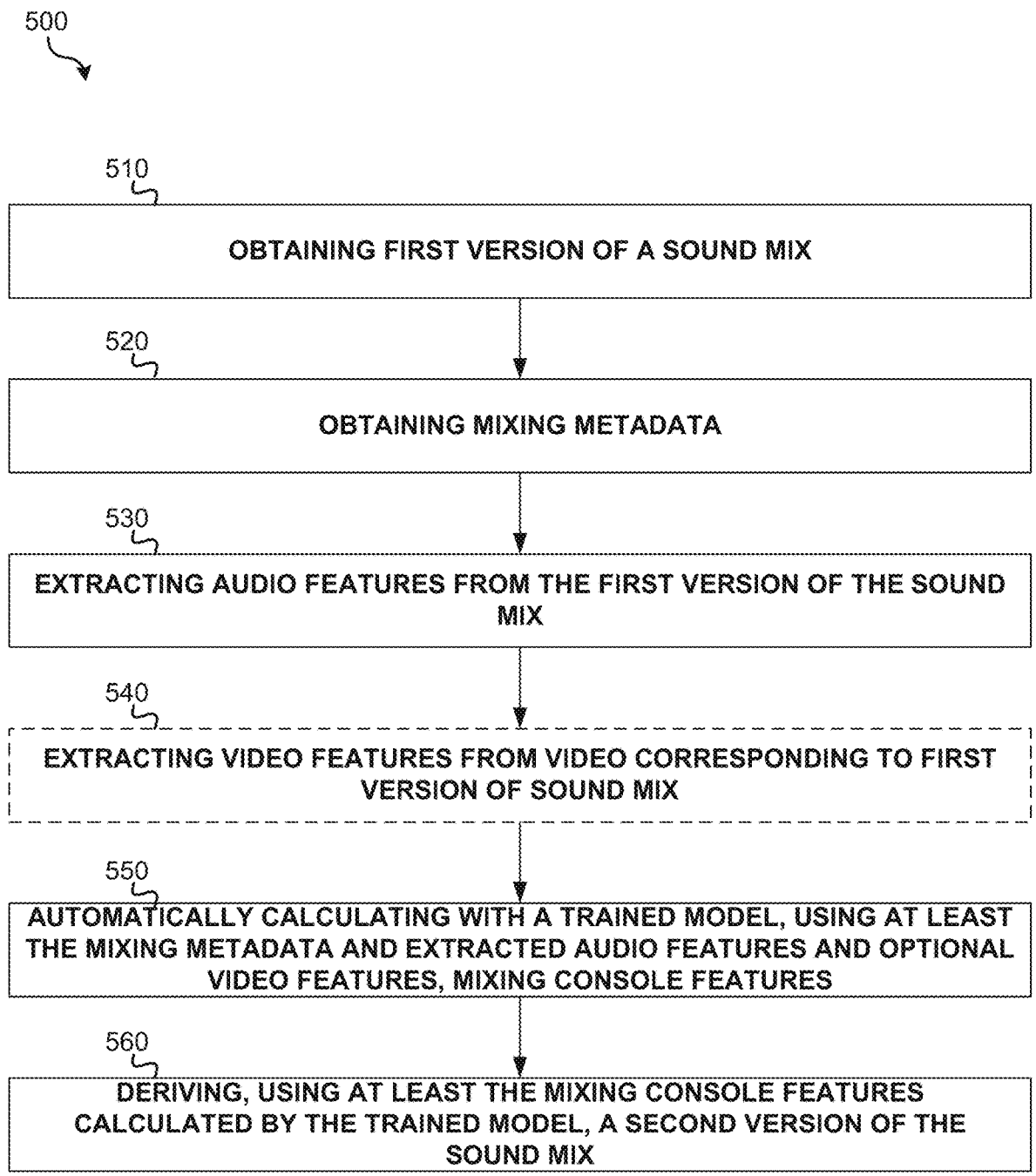
FIG. 7 is an operational flow diagram illustrating an example method of deriving a derivative version of a sound mix given an original version of a sound mix, in accordance with implementations of the disclosure.

FIG. 7 is an operational flow diagram illustrating an example method 500 of deriving a derivative version of a sound mix given an original version of a sound mix, in accordance with implementations of the disclosure. In implementations, method 500 may be performed by sound mix versioning system 400a or 400b (e.g., by executing machine readable instructions stored in a memory). Although method 500 is described with reference to creating one derivative version of a sound mix, it should be appreciated that method 500 may be applied to generate multiple derivative versions of sound mixes (e.g., sound mixes in different audio formats).

At operation 510, a first version of a sound mix is obtained. For example, the first version of the sound mix be an original sound mix including audio mix data 101 and additional mix data 102.

At operation 520, mixing metadata is obtained. The mixing metadata may be obtained from data corresponding to the first version of the sound mix, and it may identify the mixer associated with the first sound mix. For example, the mixing metadata may be extracted from mixing console data corresponding to the first version of the sound mix. Alternatively, the mixing metadata may be obtained via selection by a human mixer 499 deriving the second version of the sound mix. In such implementations, the human mixer may be presented with an option (e.g., on a display) to select the mixer to cause the model to output mixing console feature data associated with a particular mixing style of the selected mixer. Identifiers such as names or numerical identifiers of different mixers may be presented (e.g., as part of a drop-down menu). The selected mixer may be different from the mixer that created the original version of the sound mix. In this manner, the human mixer may be provided with additional configurability in iteratively fine-tuning the output of the model to be in accordance with a preferred mixing style.

At operation 530, audio features are extracted from the first version of the sound mix. For example, an audio feature extraction component 420 may be used to extract one or more of the following categories of audio feature data: (i) audio levels; (ii) audio spectral balance (e.g., frequency balance); (iii) audio spatial balance; and (iv) audio content identities.

At optional operation 540, video features are extracted from video data corresponding to the first version of the sound mix. The video features may include video frames extracted from the video data or specific data extracted from video frames. For example, data may be extracted and encoded to represent spatial orientation and/or movement of objects in a video frame in relation to one or more audio sources.

At operation 550, using at least the obtained metadata, extracted audio feature data, and optionally, the extracted video feature data, a trained model automatically calculates mixing console features (e.g., console automation data 404) corresponding to a second version of a sound mix. The mixing console feature data output by the model may represent a prediction by the trained model of the mixing console feature data of a second version of the sound mix to be derived. For example, an analysis component 430 may be used to apply one or more machine learned models to mixing metadata, audio feature data, and/or video feature data of an original sound mix to calculate mixing console features of a target version (e.g., derivative version) of the sound mix. In some implementations, a trained model may be selected to calculate mixing console feature data using at least the selected metadata. For example, depending on the mixer, one of a plurality of trained models may be selected. In some implementations, the audio format of the second version of the sound mix to be derived may also be used to determine what trained model to use to calculate the mixing console feature data. In some implementations, the model may also consider categorization metadata categorizing the type of content associated with each sound mix is extracted. Such data may be extracted from the first version of the sound mix.

At operation 560, using at least the mixing console feature data calculated by the trained model, the second version of the sound mix is derived. The second version of the sound mix may be derived by inputting the mixing console feature data (e.g., console automation data 404) into a mixing console 425 to generate derivative sound mix output. In some implementations, the second version of the sound mix may be derived using a semi-automated process that relies on the feedback of a human mixer 499. In particular, by virtue of the model outputting mixing console feature data that may be human-readable, the human mixer 499 may decide whether the output of the model for a given time range is acceptable or requires further modification. The human mixer 499 may make this decision by playing the second mixing console feature data using a hardware and/or software mixing console 425, and/or by reading a display of mixing console feature data output by the model.

Following derivation of the sound mix version at operation 560, additional post-processing operations may be performed. For example, in some implementations, the derived sound mix may be further validated by the user (e.g., using post-analysis component 450) and adjusted as needed. Additionally, metadata, mixing console feature data, and/or audio feature data of the derived sound mix may be imported into a features library 310 along with metadata, mixing console feature data, audio feature data, and/or video feature data of the original sound mix to expand the training dataset of the machine learning model.

In some implementations, the newly-generated sound mix version may be further processed to comply with technical version digital file specifications (e.g., as described above with reference to post processing component 460).

In some implementations, the trained model may also accept mixing console feature data of the first version of the sound mix as an input. Such mixing console feature data may be extracted as discussed above in advance of performing operation 550. By providing this additional input, the accuracy of the model's mixing console feature data output may potentially be improved.

Figure 8:
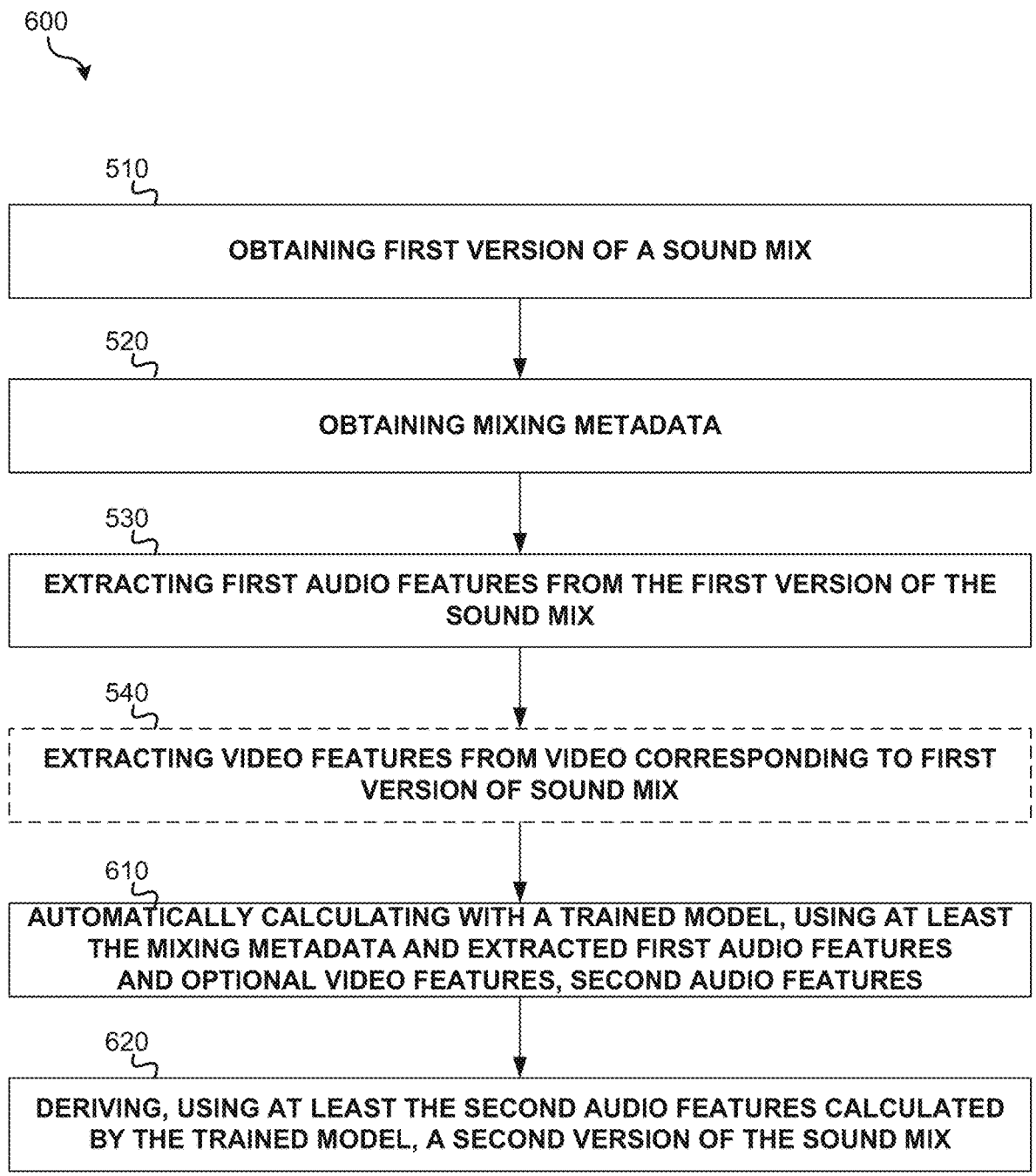
FIG. 8 is an operational flow diagram illustrating another example method of deriving a derivative version of a sound mix given an original version of a sound mix, in accordance with implementations of the disclosure.

In some implementations, the models described herein may be trained to output a prediction of audio feature data of a derivative sound mix. This prediction may be provided instead of or in addition to the output prediction including mixing console feature data predicted for a derivative sound mix. To this end, FIG. 8 is an operational flow diagram illustrating another example method 600 of deriving a derivative version of a sound mix given an original version of a sound mix, in accordance with implementations of the disclosure. In implementations, method 600 may be performed by sound mix versioning system 400a or 400b (e.g., by executing machine readable instructions stored in a memory).

Method 600 may perform operations 510-540 in a manner similar that described above with reference to method 500. At operation 610, using at least the obtained metadata, extracted first audio feature data, and optionally, the extracted video feature data, a trained model automatically calculates second audio feature data. The second audio feature data output by the model in this example may represent a prediction by the trained model of the audio feature data of a second version of the sound mix to be derived.

At operation 620, using at least the calculated second audio feature data, the derivative version of the sound mix may be derived. For example, a DSP component 440 may perform one or more of audio spatial adjustments, audio spectral adjustments, and audio level adjustment to the audio feature data of the original sound mix to derive the derivative version of the sound mix. These adjustments may result in amplitude adjustments, frequency adjustments, and/or phase adjustments to all or a subset of a digital audio waveform corresponding to the audio feature data of the original sound mix.

By way of example, an audio level increase may increase an amplitude of a digital audio waveform corresponding to the audio feature data. For instance, if an original sound mix is used to derive a particular format of sound mix that typically requires (e.g., as determined by training data) raising the volume of dialogue relative to background music as compared with other formats of sound mixes to make the dialogue clear, a dialogue stem of an original sound mix may be modified to increase the amplitude of a digital audio waveform corresponding to the dialogue stem of the original sound mix. As another example, an audio spatial adjustment that downmixes a sound mix into fewer channels (e.g., to derive a stereo sound mix from a 5.1 sound mix) may transform a source waveform corresponding to original sound mix into multiple waveforms.

In some implementations, mixing console feature data of past sound mixes may optionally be provided during training as an additional model parameter or dimension that may potentially improve the accuracy of a model trained to predict second audio feature data of a second version of a sound mix, given first feature data of an original sound mix as one of the inputs. In such examples, by virtue of using a model trained on an additional parameter (mixing console feature data) that may be cross-correlated to audio feature data, the accuracy of the model's audio feature data output may potentially be improved.

In alternative implementations of method 600, the model may instead be trained to output PCM audio (e.g., as described above with reference to system 400c) instead of second audio features. In such implementations, the output PCM audio may represent the second version of the sound mix, and operation 620 may be skipped.

Figure 9B:
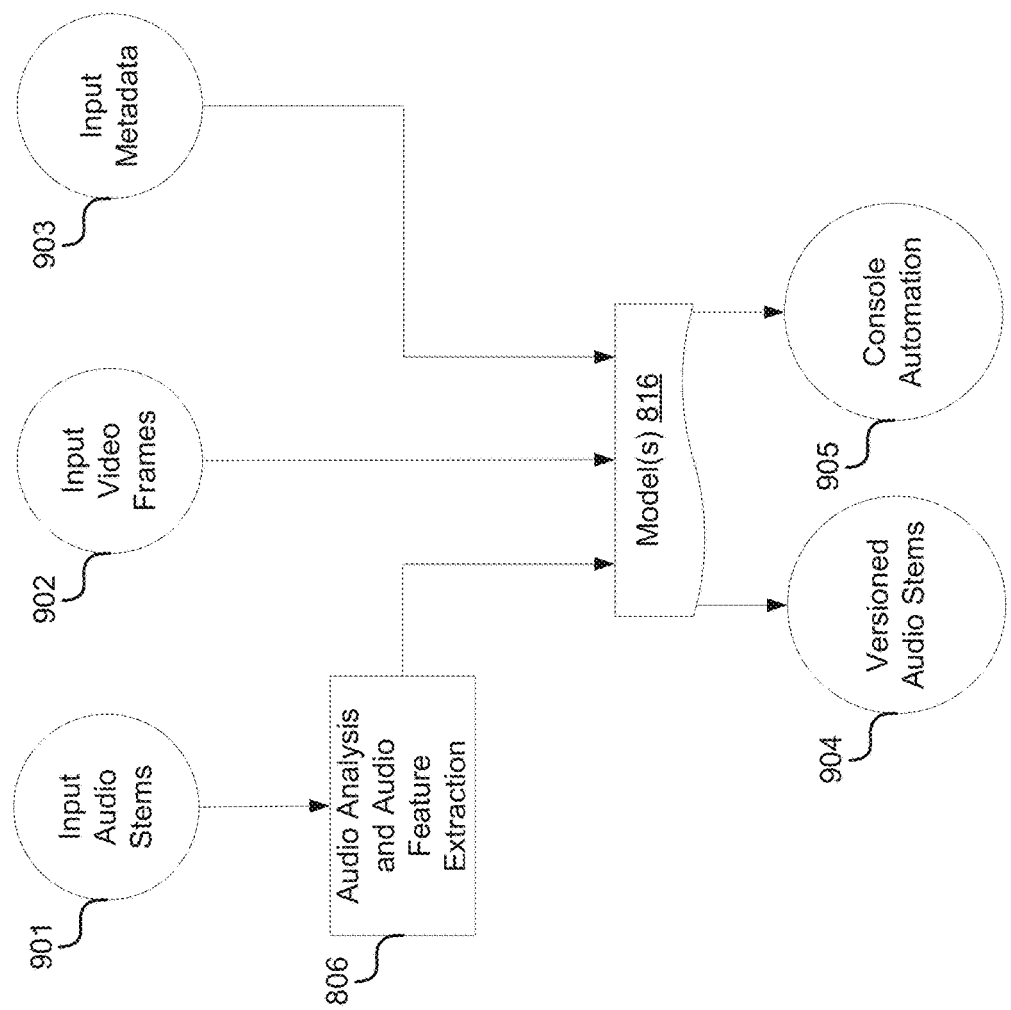
FIG. 9B is a flow diagram illustrating a particular example of using one or more constructed models to predict console automation data and audio stems of a sound mix, in accordance with implementations of the disclosure.

FIG. 9B is a flow diagram illustrating a particular example of using one or more constructed models to predict console automation data and audio stems of a sound mix, in accordance with implementations of the disclosure. The process of FIG. 9B uses one or more models 816 stored in a model library 817, as discussed above with reference to FIG. 9A. The one or more models 816 receive audio features obtained from input audio stems 901 after applying audio analysis and audio feature extraction (operation 806), input video frames 902 corresponding to the input audio stems 901, and input metadata 903 (e.g., mixing metadata). The one or more models may output versioned audio stems 904 and console automation 905. The output console automation 905 may be manually adjusted by a mixing engineer and fed back (e.g., as target console automation 804) for reinforcement training of the one or more model(s) 816.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections, including FIGS. 1, 3, 5, 7, 8, 9A, and 9B, may be embodied in, and fully or partially automated by, instructions executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium having executable instructions stored thereon that, when executed by a processor, causes the processor to perform operations comprising:
   obtaining a first version of a sound mix;
   extracting first audio features from the first version of the sound mix
   obtaining mixing metadata;
   automatically calculating with a trained model, using at least the mixing metadata and the first audio features, mixing console features, the mixing console features comprising console automation data including time-domain control values for one or more audio processing components for an audio channel; and
   deriving, using at least the mixing console features calculated by the trained model, a second version of the sound mix.

2. The non-transitory computer-readable medium of claim 1, wherein deriving the second version of the sound mix, comprises:
   inputting the mixing console features derived by the trained model into a mixing console for playback; and
   recording an output of the playback.

3. A non-transitory computer-readable medium having executable instructions stored thereon that, when executed by a processor, causes the processor to perform operations comprising:
   obtaining a first version of a sound mix;
   extracting first audio features from the first version of the sound mix
   obtaining mixing metadata;
   automatically calculating with a trained model, using at least the mixing metadata and the first audio features, mixing console features; and
   deriving, using at least the mixing console features calculated by the trained model, a second version of the sound mix, wherein deriving the second version of the sound mix, comprises: displaying to a user, in a human readable format, one or more of the mixing console features derived by the trained model.

4. The non-transitory computer-readable medium of claim 3, wherein deriving the second version of the sound mix, further comprises:
   receiving data corresponding to one or more modifications input by the user modifying one or more of the displayed mixing console features derived by the trained model; and
   updating the mixing console features based on the one or more modifications.

5. A non-transitory computer-readable medium having executable instructions stored thereon that, when executed by a processor, causes the processor to perform operations comprising:
   obtaining a first version of a sound mix;
   extracting first audio features from the first version of the sound mix
   obtaining mixing metadata;
   extracting video features from video corresponding to the first version of the sound mix;
   automatically calculating with a trained model, using at least the mixing metadata, the first audio features, and the video features, mixing console features; and
   deriving, using at least the mixing console features calculated by the trained model, a second version of the sound mix.

6. The non-transitory computer-readable medium of claim 5, wherein the operations further comprise: automatically calculating with the trained model, using at least the mixing metadata, the first audio features, and the video features, second audio features for deriving the second version of the sound mix.

7. The non-transitory computer-readable medium of claim 1, wherein:
   the mixing metadata comprises a type of mixer or an identifier of a mixer; and
   obtaining the mixing metadata, comprises: receiving data corresponding to input by a user selecting the type of mixer or the identifier of the mixer to be input into the trained model.

8. The non-transitory computer-readable medium of claim 7, wherein receiving the data corresponding to the input by the user selecting the type of mixer or the identifier of the mixer to be input into the trained model, comprises: receiving a selection of a first mixer that is different from a second mixer corresponding to the first version of the sound mix.

9. The non-transitory computer-readable medium of claim 1, wherein:
   the mixing metadata comprises a type of mixer or an identifier of a mixer; and
   obtaining the mixing metadata, comprises: extracting, from mixing console data corresponding to the first version of the sound mix, the type of mixer or the identifier of the mixer.

10. The non-transitory computer-readable medium of claim 1, wherein the operations further comprise: automatically calculating with the trained model, using at least the mixing metadata and the first audio features, second audio features for deriving the second version of the sound mix.

11. A non-transitory computer-readable medium having executable instructions stored thereon that, when executed by a processor, causes the processor to perform operations comprising:
    obtaining a first version of a sound mix;
    extracting first audio features from the first version of the sound mix;
    obtaining mixing metadata;
    automatically calculating with a trained model, using at least the mixing metadata and the first audio features, mixing console features;
    automatically calculating with the trained model, using at least the mixing metadata and the first audio features, second audio features for deriving a second version of the sound mix;
    displaying to a user a first option to derive the second version of the sound mix using the mixing console features, and a second option to derive the second version of the sound mix using the second audio features;
    receiving input from the user selecting the first option; and
    deriving, using at least the mixing console features calculated by the trained model, the second version of the sound mix.

12. A non-transitory computer-readable medium having executable instructions stored thereon that, when executed by a processor, causes the processor to perform operations comprising:
    obtaining a first version of a sound mix;
    extracting first audio features from the first version of the sound mix
    extracting video features from video corresponding to the first version of the sound mix;
    obtaining mixing metadata; and
    automatically calculating with a trained model, using at least the mixing metadata, the first audio features, and the video features:
        second audio features corresponding to a second version of the sound mix; or
        pulse-code modulation (PCM) audio or coded audio corresponding to a second version of the sound mix.

13. The non-transitory computer-readable medium of claim 12, wherein:
    automatically calculating with the trained model the second audio features or the PCM audio or the coded audio, comprises: automatically calculating with the trained model the second audio features; and
    the operations further comprise: deriving, using at least the second audio features, the second version of the sound mix.

14. The non-transitory computer-readable medium of claim 12, wherein: automatically calculating with the trained model the second audio features or the PCM audio or the coded audio, comprises: automatically calculating with the trained model the PCM audio.

15. A sound mixing system, comprising:
    one or more processors; and
    one or more non-transitory computer-readable mediums having executable instructions stored thereon that, when executed by the one or more processors, cause the one or more processors to perform operations comprising:
        obtaining a first version of a sound mix;
        extracting first audio features from the first version of the sound mix
        obtaining mixing metadata;
        automatically calculating with a trained model, using at least the mixing metadata and the first audio features, mixing console features, the mixing console features comprising console automation data including time-domain control values for one or more audio processing components for an audio channel; and
        deriving, using at least the mixing console features calculated by the trained model, a second version of the sound mix.

16. The sound mixing system of claim 15, wherein:
    the sound mixing system further comprises a mixing console; and
    deriving the second version of the sound mix, comprises:
        inputting the mixing console features derived by the trained model into the mixing console for playback; and
        recording an output of the playback.

17. The sound mixing system of claim 15, wherein deriving the second version of the sound mix, comprises: displaying to a user, in a human readable format, one or more of the mixing console features derived by the trained model.

18. The sound mixing system of claim 17, wherein deriving the second version of the sound mix, further comprises:
    receiving data corresponding to one or more modifications input by the user modifying one or more of the displayed mixing console features derived by the trained model; and
    updating the mixing console features based on the one or more modifications.

19. The sound mixing system of claim 15, wherein:
    the operations further comprise: extracting video features from video corresponding to the first version of the sound mix; and
    automatically calculating the mixing console features, comprises: automatically calculating with the trained model, using at least the mixing metadata, the first audio features, and the video features, the mixing console features.

* * * * *